United States Patent [19]

Ohie

[11] 4,359,032

[45] Nov. 16, 1982

[54] ELECTRONIC FUEL INJECTION CONTROL SYSTEM FOR FUEL INJECTION VALVES

[75] Inventor: Tomonori Ohie, Higashi-Matsuyama, Japan

[73] Assignee: Diesel Kiki Co., Ltd., Tokyo, Japan

[21] Appl. No.: 260,689

[22] Filed: May 5, 1981

[30] Foreign Application Priority Data

May 13, 1980 [JP] Japan .................................. 55-63719

[51] Int. Cl.$^3$ ......................................... F02M 51/06
[52] U.S. Cl. .................... 123/458; 123/467; 123/478; 123/486
[58] Field of Search ............... 123/445, 446, 447, 458, 123/478, 467, 480, 486, 487

[56] References Cited

U.S. PATENT DOCUMENTS

| | | | |
|---|---|---|---|
| 3,682,152 | 8/1972 | Muller-Berner | 123/478 X |
| 4,108,115 | 8/1978 | Williams et al. | 123/486 |
| 4,217,862 | 8/1980 | Fort et al. | 123/478 X |
| 4,258,674 | 3/1981 | Wolff | 123/478 X |
| 4,280,464 | 7/1981 | Kanai et al. | 123/478 X |

*Primary Examiner*—Tony M. Argenbright

*Attorney, Agent, or Firm*—Frishauf, Holtz, Goodman & Woodward

[57] ABSTRACT

An electronic fuel injection control system adapted for combination with a fuel injection valve, which comprises means for regulating the valve opening pressure of the injection nozzle of the fuel injection valve, means for regulating the injection timing of the injection nozzle, means for detecting the operating condition of an engine associated with the fuel injection valve, and means responsive to the output of the detecting means for electronically controlling the valve opening pressure regulating means and the injection timing regulating means. The electronic control means is adapted to control the valve opening pressure regulating means and the injection timing regulating means so as to obtain an injection rate, an injection timing and an injection period appropriate for the operating condition of the engine. The electronic fuel injection control system according to the invention may further include means for regulating the injection pressure of the injection nozzle, which is arranged to be controlled by the electronic control means so as to obtain an injection rate appropriate for the operating condition of the engine in cooperation with the valve opening pressure regulating means.

13 Claims, 14 Drawing Figures

ELECTRONIC FUEL INJECTION CONTROL SYSTEM FOR FUEL INJECTION VALVES

THE BACKGROUND OF THE INVENTION

This invention relates to an injection control system for use with a fuel injection valve for internal combustion engines, and more particularly to an electronic fuel injection control system which is capable of electronically controlling the injection pressure, valve opening pressure, injection timing, injection period, etc. of the injection nozzle of a fuel injection valve.

A conventional Diesel engine is provided with a fuel injection valve which is projected into each cylinder of the engine. The fuel injection valve is supplied in an injecting manner with fuel from a fuel injection pump by way of an injection pipe, to inject it into the cylinder. Unit injectors are also conventionally used which are each a one-piece combination of a fuel injection valve and a fuel injection pump formed of a solenoid valve or the like and in which the fuel injection valve is supplied directly with fuel from the fuel injection pump to carry out injection of the fuel.

The fuel injection quantity Q obtained by those conventional fuel injection valves is determined by an equation of $Q = CAt\sqrt{P}$, provided that A represents the effective opening area of the injection nozzle, t the injection period, and P the injection pressure (kg/cm$^2$), respectively. Therefore, the fuel injection quantity Q can be controlled by varying the variables A, t, P.

Fuel injection systems conventionally used in Diesel engines employ a system in which the fuel injection quantity is controlled by changing the injection period. However, to change the injection period for control of the fuel injection quantity can unfavorably affect the engine combustion, which conventionally caused problems of exhaust gas and combustion noise as well as horsepower. According to those conventional fuel injection systems are capable of changing the fuel injection pressure. However, the change of the fuel injection pressure merely depends upon the engine rpm. No fuel injection system which is capable of positively controlling the fuel injection pressure has been proposed as yet. There have been proposed fuel injection systems of the type changing the valve opening pressure of the injection nozzle so as to control the lift of the nozzle needle. However, these systems are only capable of controlling the injection beginning and the injection end, but are not capable of controlling the injection rate.

OBJECTS AND SUMMARY OF THE INVENTION

It is a primary object of the invention to provide an electronic fuel injection control system for fuel injection valves, which is capable of controlling the fuel injection quantity by changing the injection rate through changing of the valve opening pressure, i.e., effective opening area of the injection nozzle, and together with the fuel injection pressure of the injection nozzle if required, to thereby avoid the need of changing the injection period. The injection period can always be maintained at values appropriate for the operating condition of an engine associated with the system, to thereby obtain improved exhaust gas, combustion noize and horsepower characteristics of the engine.

It is another object of the invention to provide an electronic fuel injection control system for fuel injection valves, which is adapted to control the fuel injection quantity by changing particularly the valve opening pressure of the injection nozzle through changing of the effective opening area of the injection nozzle, to thereby achieve efficient and accurate control of the fuel injection quantity.

It is a further object of the invention to provide an electronic fuel injection control system for fuel injection valves, which employs valves arranged to control the injection pressure, the injection nozzle, respectively, which are employed in place of conventional mechanical controlling measures, the valves being arranged to be electronically controlled by means of feedback in response to the operating condition of the engine so that accurate control of the injection rate, the injection timing, the injection period, etc. is feasible.

According to the invention, there is provided an electronic fuel injection control system adapted for combination with at least one fuel injection valve, which comprises: pressurized fuel supply means; passage means for leading pressurized fuel from the fuel supply means to the injection nozzle of the fuel injection valve: injection timing regulating means for selectively opening and closing the passage means; valve opening pressure regulating means for regulating the valve opening pressure of the injection nozzle; detecting means for detecting a condition of an engine associated with the fuel injection valve to produce electrical signals indicative of the condition of the engine; and electronic control means responsive to the electrical signals to control the injection timing regulating means and the valve opening pressure regulating means. The electronic control means is arranged to arithmetically calculate first and second control signals in a predetermined manner in response to the electrical signals and supply the first control signal to the injection timing regulating means to cause same to obtain a desired injection timing for the condition of the engine, and the second control signal to the valve opening pressure regulating means to cause same to obtain a desired injection rate for the condition of the engine. The system according to the invention may further include injection pressure regulating means for regulating fuel pressure being supplied to the injection nozzle. The electronic control means may also be arranged to arithmetically calculate a third control signal in a predetermined manner in response to the electrical signals from the detecting means and supply the third control signal to the valve opening pressure regulating means and the injection pressure regulating means to cause same to obtain an injection rate desired for the operating condition of the engine.

The above and other objects, features and advantages of the invention will be more apparent from the ensuing detailed description taken in connection with the accompanying drawings in which:

DETAILED DESCRIPTION

Figure 1:
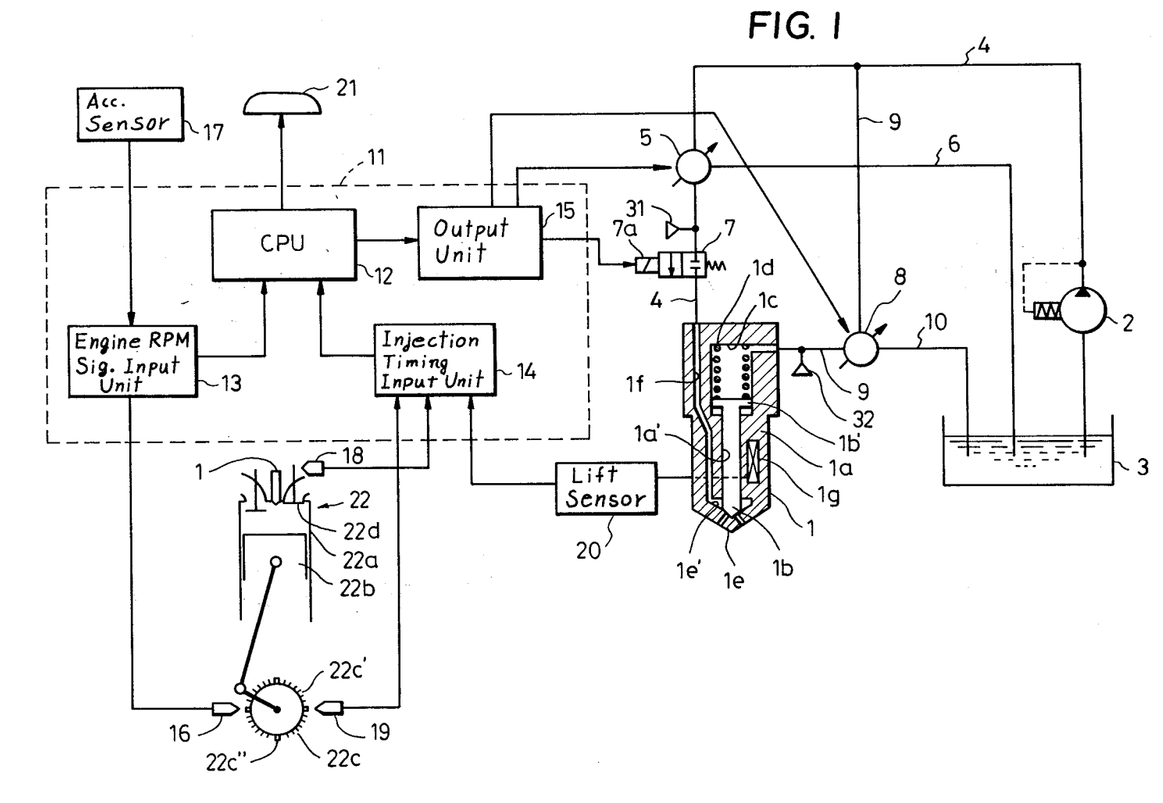
FIG. 1 is a diagrammatic illustration of the whole structure of an electronic fuel injection control system for fuel injection valves, embodying the present invention.
Figure 2:
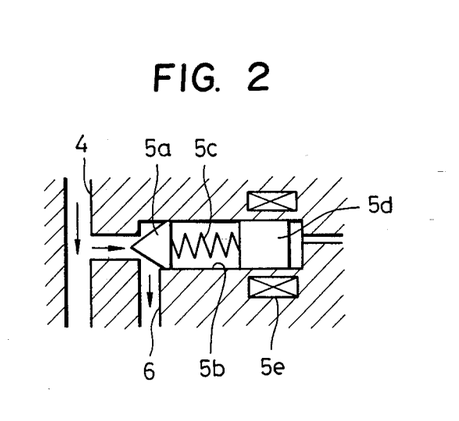
FIG. 2 is a schematic sectional view of the injection pressure control valve used in the arrangement of FIG. 1.

The present invention will now be described in detail with reference to the drawings. FIG. 1 illustrates the whole structure of the electronic fuel injection control system for fuel injection valves according to the invention. Reference numeral 1 designates to fuel injection valve having a hole nozzle which is installed in a cylinder head 22a of an engine 22 associated with the system according to the invention. A nozzle needle 1b is slidably fitted in an axial bore 1a' formed in the nozzle holder 1a of the valve 1. The nozzle holder 1a is formed therein with a chamber 1c located at a rear end of the nozzle needle 1b, in which a piston 1b' formed integrally with the nozzle needle 1b is slidably fitted. Further disposed within the chamber 1c is a coil spring 1d in a manner supported at its end by the piston 1b', which spring takes part in setting the valve opening pressure of the nozzle needle. The nozzle holder 1a includes a nozzle hole portion 1e formed therein with a pressure chamber 1e' in which the tip of the nozzle needle 1b is located and with which communicates a pressure passage 1f formed in the peripheral wall of the nozzle holder 1a. As is known, fuel pressure within the pressure chamber 1e' forces the nozzle needle 1b to be lifted against the force of the spring 1d. In FIG. 1, reference numeral 2 denotes a fuel pump which sucks fuel from a fuel tank 3 and feeds it to the above pressure passage 1f through a fuel supply line 4. A pressure control valve 5 is provided across the fuel supply line 4 at a location between the fuel pump 2 and the pressure passage 1f, for variably setting the injection pressure of the nozzle. This valve 5 may have a construction shown in FIG. 2, for instance. It has a valve body 5a disposed within a bore 5b so as to close a return passage 6 which branches from the fuel supply line 4 and communicates with the fuel tank 3. Further arranged within the bore 5b are a coil spring 5c and a movable core 5d formed of a magnetic material. The movable core 5d can be displaced in the bore 5b by controlling the energization of a solenoid 5e arranged around the bore 5b to vary the urging force of the coil spring 5c against the valve body 5a.

In FIG. 1, an injection timing control valve 7, which is formed of a two port connection/two position solenoid valve, is arranged across the fuel supply line 4 in series to the injection pressure control valve 5. A pressure control valve 8 is provided in communication with the spring-accomodated chamber 1c in the nozzle holder 1a of the fuel injection valve 1 by way of a line 9 hereinafter referred to, for variably setting the valve opening pressure of the nozzle. This valve 8 may have a construction substantially identical with that of the injection pressure control valve 5 illustrated in FIG. 2, and is arranged so as to close a line 10 which communicates with both the passage 9 communicating with the chamber 1c and the fuel tank 3. In FIG. 1, reference numerals 31, 32 designate pressure sensors provided in communication with the lines 4 and 9, respectively, for detecting fuel pressure set by the control valves 5, 8. These sensors 31, 32 may be formed of a strain gauge, a piezo-electric pickup or a semiconductor sensor, all being already known.

In FIG. 1, reference numeral 11 designates an electronic control unit for controlling the above-mentioned valves 5, 7, 8, which comprises a central processing unit (CPU) 12, an input unit 13 arranged to be supplied with an engine rpm signal, another input unit 14 arranged to be supplied with an injection timing signal, and an output unit 15. Connected to the engine rpm signal input unit 13 are an rpm sensor 16 for detecting the engine rpm and an accelerator position sensor 17 for detecting the amount of operation of an accelerator pedal, not shown, of an automotive vehicle, not shown, associated with the engine 22. Connected to the injection timing signal input unit 14 are an exhaust valve position sensor 18 for detecting closing of an exhaust valve 22d provided in the cylinder 22a of the engine 22, a top dead center position of the piston 22b within the engine cylinder 22a, and a nozzle needle lift sensor 20 for detecting the lift timing of the nozzle needle 1b of the fuel injection valve 1. Reference numeral 21 denotes a display unit for indicating the operation of CPU 12.

The above sensors 16, 18, 19 are each formed of an electromagnetic pickup, and the sensors 16, 19 are arranged close to the perimeter of a rotary shaft (crankshaft) 22c of the engine 22. In the illustrated embodiment, the engine 22 is a four-cylinder type. The rotary shaft 22 has its outer peripheral wall formed with a predetermined number of teeth 22c' circumferentially arranged at equal intervals.

During rotation of the rotary shaft 22c, the number of teeth 22c' passing by the electromagnetic pickup or rpm sensor 16 is detected by the sensor 16. Four protuberances 22c" are formed on the outer peripheral wall of the rotary shaft 22c at circumferentially equal intervals in axially staggered relation, and the top dead center positions of the pistons within the four cylinders are detected by the respective TDC sensors 19 (only one of them is shown) arranged opposite the protuberances 22c" each time the protuberances 22c" pass by the respective TDC sensors 19. The exhaust valve position sensor 18 is arranged close to the valve rod of the exhaust valve 22d, which rod is formed of a magnetic material. The nozzle needle lift sensor 20 is connected to a solenoid 1g embedded in the peripheral wall of the nozzle holder 1a at a location close to the nozzle needle 1b in the fuel injection valve 1, to detect the lifting motion of the nozzle needle 1b.

With the above arrangement, as the rotary shaft 22 is rotated, the engine rpm signal input unit 13 is supplied with an rpm signal from the rpm sensor 16 and an accelerator operation amount signal from the accelerator position sensor 17, while the injection timing signal input unit 14 is supplied with an exhaust valve position signal from the exhaust valve position sensor 18, a piston TDC position signal from the TDC sensor 19, and a nozzle needle lift timing signal from the nozzle needle lift sensor 20. These input signals are converted into signals suitable for computing operation of CPU 12, by the input units 13, 14, and then supplied to CPU 12. CPU 12 carries out computing operation in accordance with programs previously stored therein (e.g., speed governing data, injection timing data) to supply control signals to the output unit 15. The output unit 15 operates in response to these control signals to drive the injection pressure control valve 5, the injection timing control valve 7 and the valve opening pressure control valve 8. The operations of these control valves 5, 7, 8 are corrected by means of detected value signals from the aforementioned injection pressure sensor 31 and valve opening pressure sensor 32, as hereinafter described.

Under the above-mentioned control of the electronic control unit 7, fuel which has been supplied under pressure from the fuel pump 2 to the injection nozzle of the fuel injection valve 1 through the fuel supply line 4, has its pressure controlled to values appropriate for the operating state of the engine by means of the injection pressure control valve 5. The fuel supply line 4 is controlled to open or close by means of the injection timing control valve 7 so that the injection timing and injection period of the fuel injection valve 1 are appropriate for the operating condition of the engine. The valve opening pressure control valve 7 controls the pressure in the chamber 1c formed within the fuel injection valve 1 to set a valve opening pressure of the injection nozzle at appropriate values for the operating condition of the engine.

Figure 3:
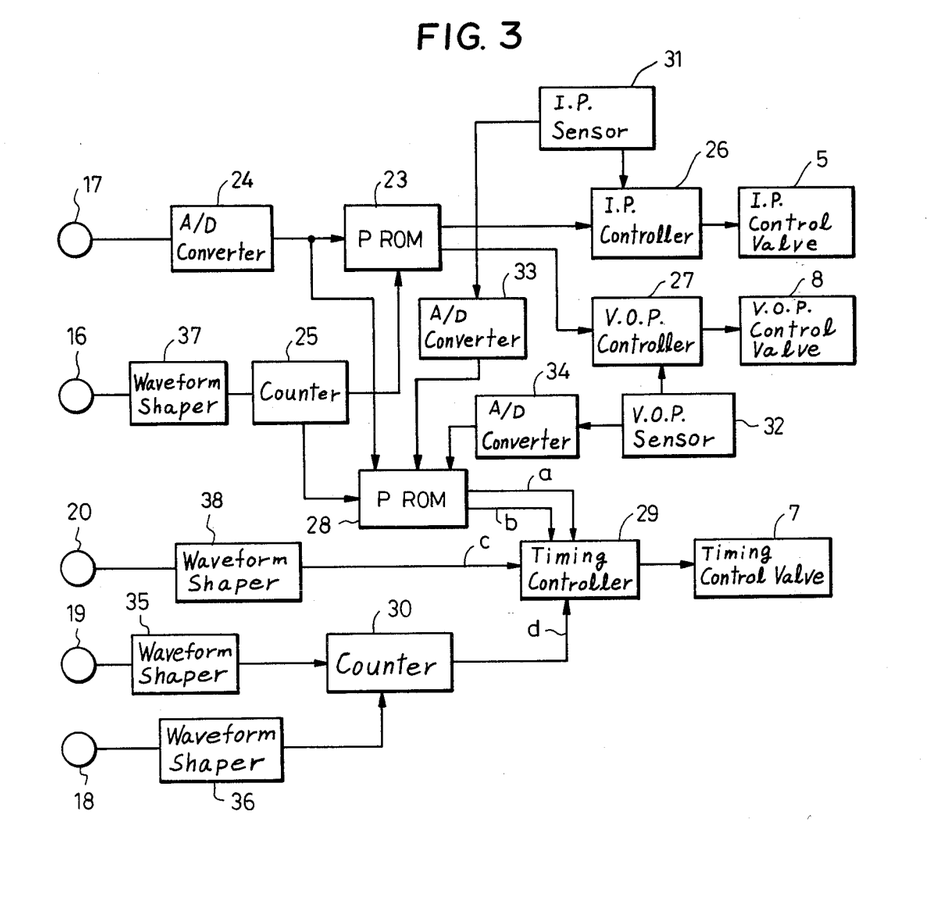
FIG. 3 is a block diagram of one form of the interior construction of the electronic control unit seen in FIG. 1.

FIG. 3 illustrates more in detail the construction of the system shown in FIG. 1, particularly the interior construction of the electronic control unit 7. Reference numeral 23 designates a programmable read only memory (P ROM) which forms part of CPU 12 and to the input of which are connected the accelerator position sensor 17 by way of an A/D converter 24, and the rpm sensor 16 by way of a waveform shaper 33 and a counter 25, respectively. Stored in P ROM 23 is an engine speed governing control program, based upon which P ROM 23 operates to produce control pulse signals corresponding to digital signals supplied thereto from the A/D converter 24 and the counter 25. P ROM 23 is connected at its output to an injection pressure controller 26 and a valve opening pressure controller 27. The injection pressure controller 26 is responsive to a control pulse signal from P ROM 23, which is a function of the engine rpm and the injection quantity, to supply a pulse signal having a controlled pulse width to the solenoid 5e of the injection pressure control valve 5 (FIG. 2) to energize it. Similarly, the valve opening pressure controller 27 is responsive to a control pulse signal from P ROM 23 to supply a pulse signal having a controlled pulse width to the solenoid, not shown, of the valve opening pressure control valve 8 to energize it. The injection controller 26 and the valve opening pressure controller 27 are supplied with output signals from the injection pressure sensor 31 and the valve opening pressure sensor 32, respectively, to have their output pulse signal pulse widths corrected in response to actual injection pressure and actual valve opening pressure.

In FIG. 3, reference numeral 28 designates another P ROM also forming part of CPU 12. Connected to the input of P ROM 28 are the aforementioned counter 25, and the accelerator position sensor 17, the injection pressure sensor 31 and the valve opening pressure sensor 32 by way of their respective A/D converters 24, 33 and 34. Stored in P ROM 28 are control programs on the injection timing and the injection period, based upon which P ROM 28 operates to produce control pulse signals corresponding to an engine load signal, an injection pressure signal and a valve opening pressure signal supplied, respectively, from the sensors 16, 31 and 32. P ROM 28 is connected at its output to the input of the timing controller 29 which is further connected to the exhaust valve position sensor 18 by way of a waveform shaper 35 and a counter 30, as well as the nozzle needle lift sensor 20 by way of a waveform shaper 38, respectively. The counter 30 has its clear-input R connected to the exhaust valve position sensor 18 by way of a waveform shaper 36. The sensor 18 is adapted to produce an output signal upon detecting closing of the exhaust valve 22d and supplies it to the counter 30 to reset it to zero. After being resetted by the exhaust valve position sensor 18, the counter 30 issues a binary output of 1 when it has been supplied with a predetermined number of pulses (in a four-cycle engine, two pulses) from an associated TDC sensor 19. The injection timing controller 29, which is arranged as above, is supplied with an injection timing control pulse signal a and an injection period control pulse signal b from P ROM 28 as functions of actual engine rpm, engine load, injection pressure and valve opening pressure, a pulse signal c representing actual nozzle needle lift timing from the waveform shaper 38, and a pulse signal d representing the top dead center position of the piston within an associated engine cylinder relative to the closing timing of the exhaust valve 22d, respectively. The controller 29 operates in response to the values of these signals a-d to supply a control pulse signal to the solenoid 7a of the injection timing control valve 7 (FIG. 1) to drive it, with such a timing and pulse width as causes lifting of the nozzle needle 1b at an appropriate position of the piston within the engine cylinder and for an appropriate injection period for the operating condition of the engine.

Figure 4:
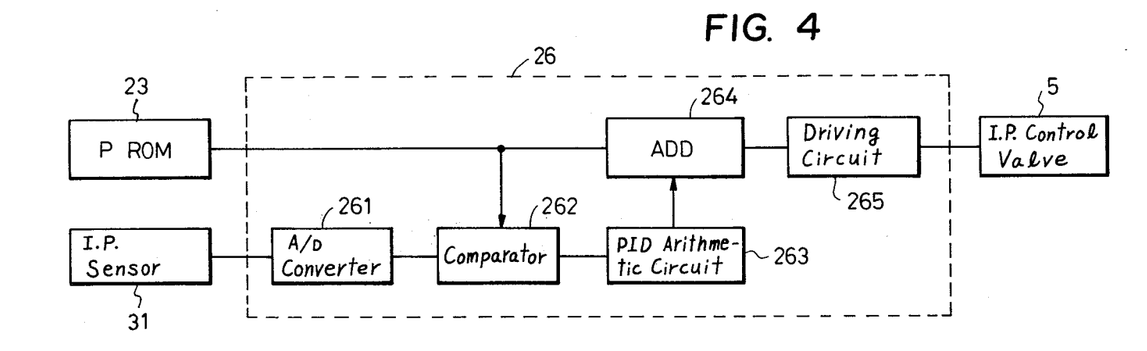
FIG. 4 is a block diagram of one form of the interior construction of the injection pressure controller seen in FIG. 3.
Figure 5:
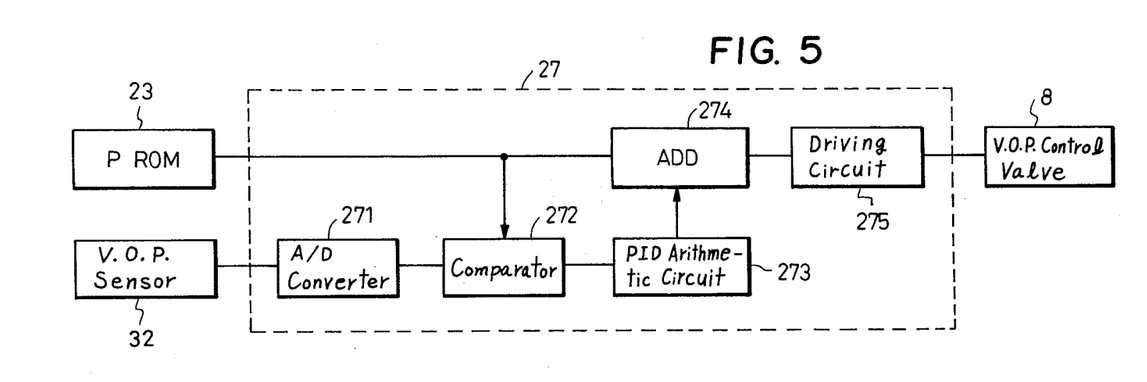
FIG. 5 is a block diagram of one form of the interior construction of the valve opening pressure controller seen in FIG. 3.
Figure 6:
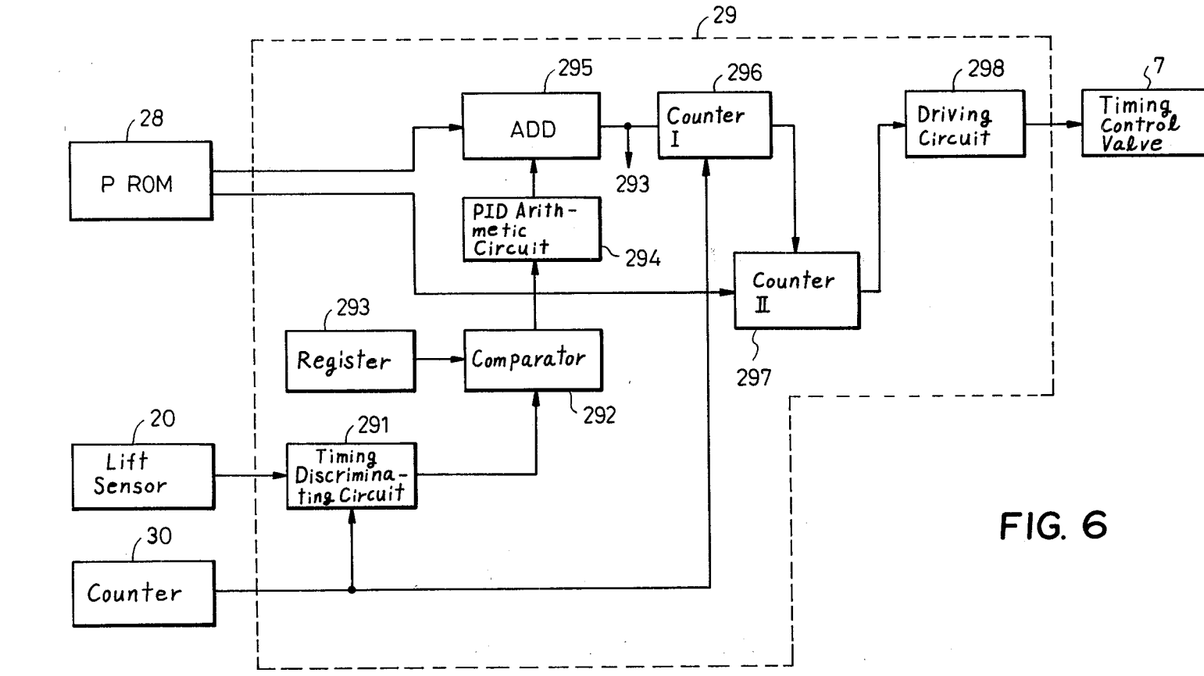
FIG. 6 is a block diagram of one form of the interior construction of the injection timing controller seen in FIG. 3.

FIGS. 4, 5 and 6 illustrate in block form the interior constructions of the injection pressure controller 26, the valve opening pressure controller 27 and the injection timing controller 29, respectively. Referring first to FIG. 4, the injection pressure sensor 31 is connected to the input of an A/D converter 261 which in turn has its output connected to one input of a comparator 262. The comparator 262 has its other input connected to the output of P ROM 23 in FIG. 3 and its output connected to a PID arithmetic circuit 263 which in turn has its output connected to one input of an adder 264. The adder 264 has its other input connected to the output of P ROM 23 and its output connected to the input of a driving circuit 265 which in turn has its output connected to the solenoid of the injection pressure control valve 5.

An analog voltage signal from the injection pressure sensor 31 is converted into a corresponding digital signal by the A/D converter 261 and applied to the comparator 262 as an actual injection pressure signal. This comparator 262 is also supplied with a control pulse signal representing a target injection pressure value from P ROM 230 and compares between the value of the actual injection pressure signal and the value of the target injection pressure signal to supply an output of the difference between the two values to the PID arithmetic circuit 263 which in turn carries out PID operation based upon the input to apply the resulting correcting value to the adder 264. In the adder 264, the correcting value is added to the target value from P ROM 23 to obtain a controlling value. This controlling value is supplied to the driving circuit 265 which produces an output corresponding to this controlling value to drive the injection pressure control valve 5.

On the other hand, the interior construction of the valve opening pressure controller 27 is just identical with that of the injection pressure controller 26 described just above. That is, the controller 5 comprises an A/D converter 271, a comparator 272, a PID arithmetic circuit 273, an adder 274, and a driving circuit 275, all of which are arranged and connected in a manner identical with the corresponding components of the injection pressure controller 26, and is distinguished from the controller 26 only in that the A/D converter 271 is connected at its input to the valve opening/pressure sensor 32 and the driving circuit 275 is connected at its output to the valve opening pressure control valve 8. Therefore, the operation of the controller 27 in FIG. 5 is substantially the same as that of the controller 26 described above, description of which is therefore omitted.

Reference is now made to FIG. 6 illustrating the interior construction of the injection timing controller 29. According to the system of the invention, in order to compensate for variations or deterioration with age in the performance of fuel injection valves applied, the nozzle needle lift sensor 20 is provided for the system to carry out a closed loop control through feedback of the output of the sensor 20. The nozzle needle lift sensor 20 and the counter 30 seen in FIG. 3 are connected to the input of an injection timing discriminating circuit 291 which in turn has its output connected to one input of a comparator 292. The comparator 292 has its other input connected to the output of a register 293 storing the control value calculated in the last loop. The comparator 292 is connected at its output to the input of a PID arithmetic circuit 294 which in turn is connected at its output to one input of an adder 295. The adder 295 has its other input connected to the output of P ROM 28 and its output connected to the input of a counter 296. The counter 296 is connected at its input to the output of the counter 30 so as to be supplied with an output pulse from the counter 30 as a trigger pulse. The counter 296 is further connected at its output to another counter 297 so as to supply an output thereto as a trigger pulse. The counter 297 has its input connected to the output of P ROM 28 and its output to the input of a driving circuit 298, respectively. The driving circuit 297 is connected at its output to the solenoid 7a of the injection timing control valve 7.

With the above arrangement, the injection timing discriminating circuit 291 is supplied with outputs from the counter 30 and the nozzle needle lift sensor 20 to determine the actual injection timing of the fuel injection valve 1 and apply an actual injection timing signal to the comparator 292. The comparator 292 is, on the other hand, supplied with a control signal representing the injection timing in the last loop from the register 293 to supply a signal representing the difference between the above two inputs to the PID arithmetic circuit 294. The PID arithmetic circuit 294 arithmetically calculate a required correcting value on the basis of the above difference value signal and applies a required correcting value signal to the adder 295. On the other hand, P ROM 28 selectively produces a target injection timing value signal in response to the outputs from the rpm sensor 16, the accelerator position sensor 17, the injection pressure sensor 31 and the valve opening pressure sensor 32 which are shown in FIG. 3, the target value signal being supplied to the adder 295. This target value signal has a pulse signal having a predetermined frequency. The adder 295 calculates the sum of the values of the above correcting value signal and target injection timing value signal and supplies a sum value signal having a frequency corrected with respect to the target value in response to the correcting value signal, to the counter 296 as a control signal. On the other hand, the counter 296 is triggered by a top dead center position signal of the piston on its exhaust stroke from the counter 30 to start counting pulses of the above control signal from the adder 295. When the counter 296 has counted a predetermined number of such pulses, it produces a binary output of 1 which is then applied to the counter 297. The counter 297 is triggered by this binary output of 1 to start counting output pulses from P ROM 28. The number of output pulses produced from P ROM 28 is set at a value appropriate for the operating state of the engine, as a function of outputs of the rpm sensor 16, the accelerator position sensor 17, the injection pressure sensor 26 and the valve opening pressure sensor 32, the number of the output pulses being one produced for a period from a top dead point of the piston of the engine on its exhaust stroke immediately before a top dead point thereof on its compression stroke to the next top dead point thereof on its exhaust stroke. The counter 297 starts producing a binary output of 1 at its output and supplies it to the driving circuit 298 at the same time as it starts the above counting action. As long as the driving circuit 298 is supplied with the above binary output of 1, it continuously energizes the solenoid 7a of the injection timing control valve 7 to cause it to open the fuel supply line 4 in FIG. 1. The counter 297 is adapted to produce a binary output of 0 when it has counted a predetermined number of pulses. When the counter 297 has counted the predetermined number of pulses from P ROM 28, it supplies a binary output of 0 to the driving circuit 298 to interrupt the operation of the circuit 298 so that the injection timing control valve 7 closes the line 4.

Figure 7:
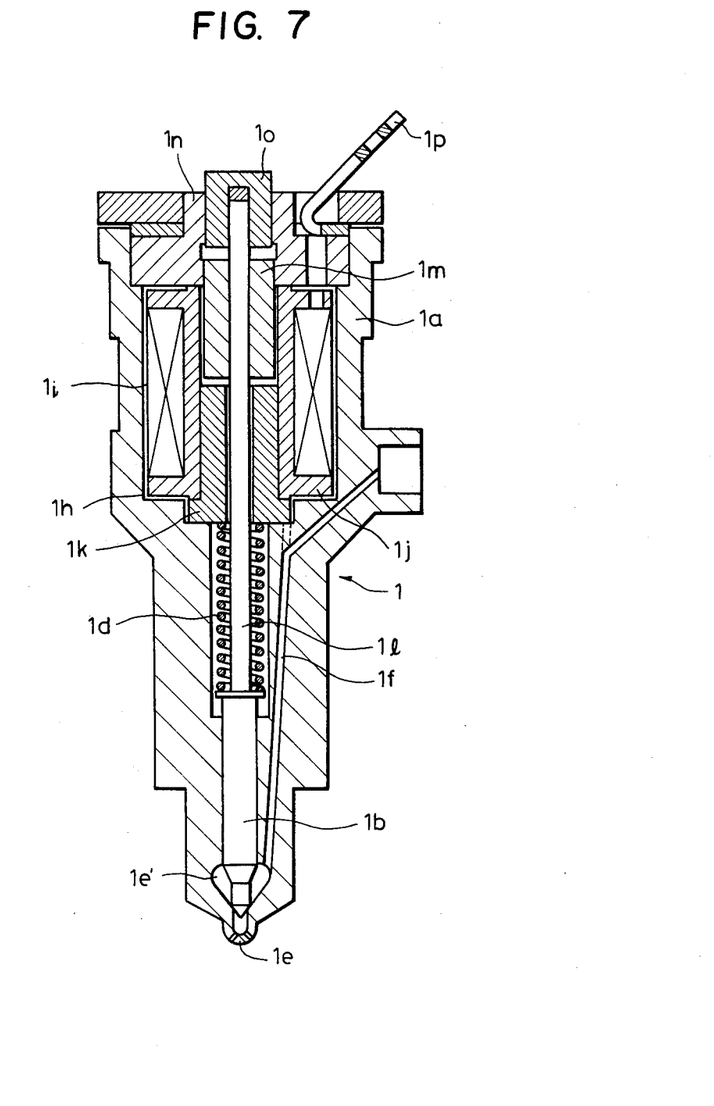
FIG. 7 is a longitudinal sectional view of a fuel injection valve provided with another valve opening pressure changing means applicable to the present invention.

FIG. 7 illustrates another type of valve opening pressure regulating means for the injection nozzle which is applicable to the fuel injection control system according to the invention. This valve opening pressure regulating means may supersede the valve opening pressure regulating means constituted by the pressure control valve 8, the chamber 1c within the nozzle holder 1a, etc. as illustrated in FIG. 1. In FIG. 7, corresponding or like parts of elements to those in FIG. 1 are designated by identical reference numerals.

A solenoid 1*i* is supported on a yoke 1*j* arranged within a cavity 1*h* formed in an end portion of the nozzle holder 1*a* remote from the injection hole portion 1*e*. A stator core 1*k* is unmovably placed in the bottom portion of the cavity 1*h* with its part inserted in the yoke 1*j*. The nozzle needle 1*b* has an extension 1*l* at its end remote from the nozzle hole portion 1*e*, which axially extends through the stator core 1*k* and has a movable core 1*m* secured to its tip portion. A coil spring 1*d* is interposed between the stator core 1*k* and the nozzle needle 1*b* in a manner fitted on the extension 1*l* and permanently urges the nozzle needle 1*b* toward the nozzle hole portion 1*e*. In FIG. 7, reference numeral 1*n* designates a guide member for the movable core 1*m*, 1*o* a stopper threadedly fitted in the guide member 1*n* and adjustable in position, 1*p* a feeding terminal for the solenoid 1*i*, connected to the output unit 15 of the electronic control unit 11 in FIG. 1.

With the above arrangement, when the solenoid 1*i* is energized by electric current supplied thereto through the feeding terminal 1*p* from the output unit 15 of the electronic control unit 11, electromagnetic force is produced which urges the movable core 1*m* toward the stator core 1*k*. On the other hand, the nozzle needle 1*b* is permanently urged by the coil spring 1*d* toward the nozzle hole portion 1*e*. Therefore, the nozzle needle 1*b* which is integral with the movable core 1*m* is urged toward the nozzle hole portion 1*e* by a force which is the sum of the force of the coil spring 1*d* and the electromagnetic force acting upon the movable core 1*m*. Therefore, the valve opening pressure of the fuel injection valve 1 can be controlled by varying the electric current to be supplied to the solenoid 1*i*.

Figure 8:
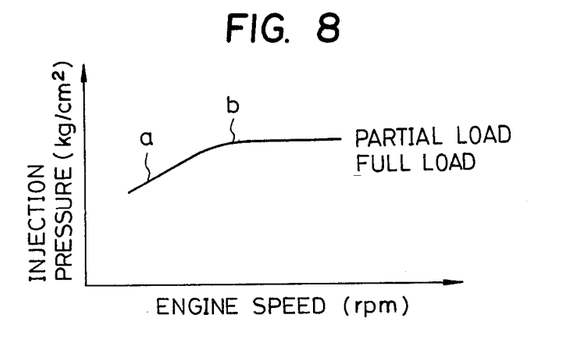
FIG. 8 is a graph showing an exemplary setting of target values of the injection pressure.
Figure 9:
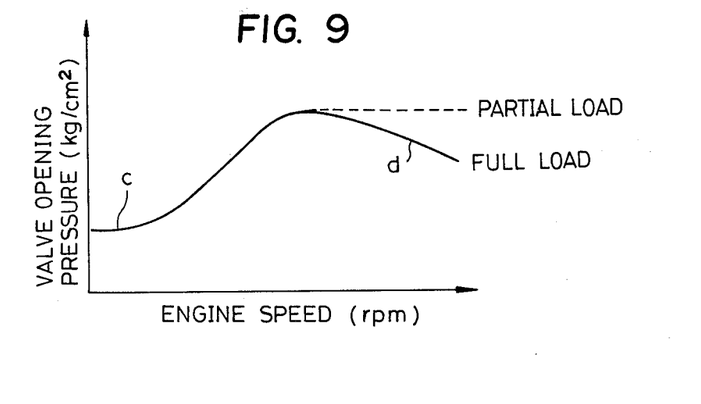
FIG. 9 is a graph showing an exemplary setting of target values of the valve opening pressure.
Figure 10:
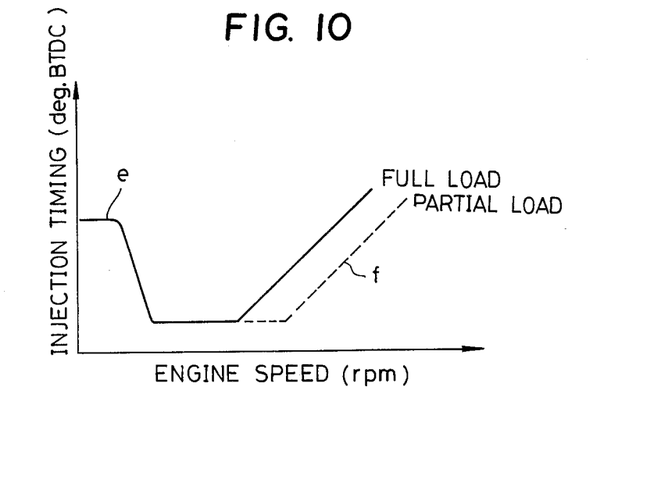
FIG. 10 is a graph showing an exemplary setting of target values of the injection timing.

FIGS. 8, 9 and 10 show exemplary settings of target values which are set in CPU 12 of the electronic control unit 11 for controlling the injection pressure control valve 5, the valve opening pressure control valve 8 and the injection timing control valve 7, respectively. Referring first to FIG. 8, the target injection pressure relative to engine rpm is set at common values both in an engine full-load state and an engine partial-load state. In engine idle region, the target injection pressure is set at lower values than in the other regions, as indicated by symbol a to lengthen the injection period so as to reduce idling noise. In engine middle speed region, the target injection pressure already reaches a highest level, as indicated by symbol b to ensure sufficient horsepower. Referring next to FIG. 9, the target valve opening pressure relative to engine rpm is set at lower values in low engine speed region than in the other regions, as indicated by symbol c to obtain a stable injection operation as well as reduce idling noise. In high engine speed and full-load region, the target valve opening pressure is set at relatively lower values than in partial-load region, as indicated by symbol d, because in engine full-load region the engine temperature increases to cause advance in the engine combustion timing relative to the injection timing, thus resulting in a reduction in fuel consumption. Lastly in FIG. 10 where the injection timing is represented in the angle of the engine crankshaft before the top dead center position of the piston on its compression stroke, the target injection timing is set at larger degrees of crankshaft angle as indicated by symbol e to advance injection timing at the start of the engine so as to ensure stable starting of the engine. In middle and high engine speed regions, the target injection timing is set at relatively lower degrees of crankshaft angle in partial-load region, particularly at an engine load three fourths as large as the full load of the engine, than in full-load region, as indicated by symbol f to retard injection timing so as to reduce the amount of NOx in the engine exhaust gas.

Figure 11:
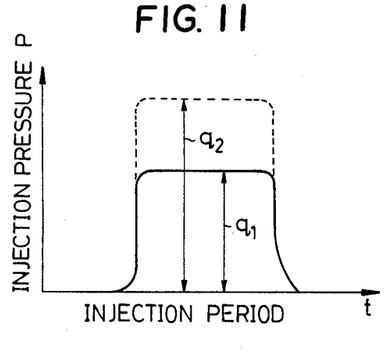
FIG. 11 is a graph showing the operating characteristic of the injection pressure control valve obtainable through control of the system of the invention.
Figure 12:
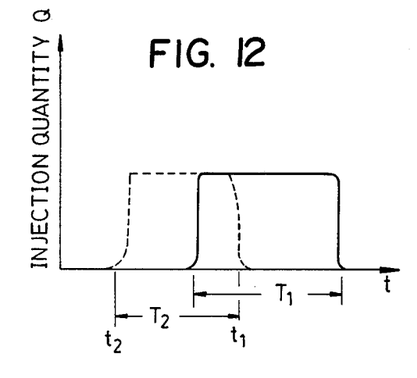
FIG. 12 is a graph showing the operating characteristic of the injection timing control valve obtainable through control of the system of the invention.
Figure 13:
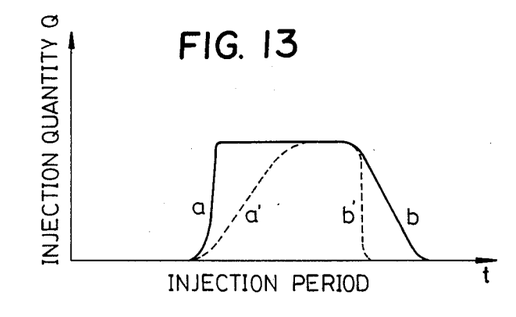
FIG. 13 is a graph showing the operating characteristic of the valve opening pressure obtainable through control of the system of the invention.
Figure 14:
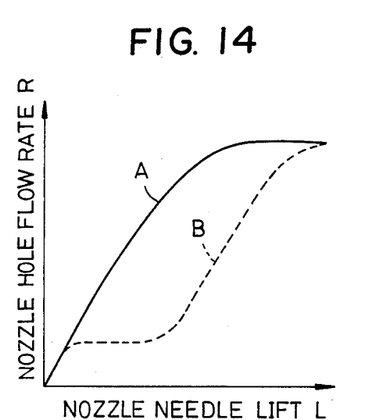
FIG. 14 is a graph showing the nozzle hole flow rate characteristic of an injection nozzle used in the system of the invention, obtainable through control of the system.

FIGS. 11 through 14 show the operating characteristics of the injection pressure control valve 5, the injection timing control valve 7 and the valve opening pressure control valve 8, respectively. In FIG. 11, there is plotted the operating characteristic of the injection pressure control valve 5. It is noted that according to the invention the injection pressure P can be controlled variably between a minimum value curve indicated by the solid line and a minimum value curve indicated by the break line, having its top amplititude controllable variably between q1 and q2. Referring next to FIG. 12 showing the operating characteristic of the injection timing control valve 7, under the control of the system of the invention the valve 7 can operate to vary both the injection beginning t1 and t2 and the injection period between T1 and T2. Referring to FIG. 13 showing the operating characteristic of the valve opening pressure control valve 8, the leading edge of the valve opening pressure curve can be controlled variably between a and a', and the trailing edge of the curve between b and b', respectively. Referring lastly to FIG. 14, the flow rate Q' of fuel through the nozzle holes of the injection nozzle can be controlled variably between A and B, relative to the nozzle needle lift L, according to the operation of the valve opening pressure control valve 8.

As set forth above, according to the invention, the control valves 5, 7, 8 for controlling the injection pressure, injection timing and injection period of the fuel injection valve 1, respectively, are arranged to be electrically controlled in accordance with predetermined control programs in response to various factors representing the operating state of the engine such as engine rpm, amount of operation of accelerator, piston position within an engine cylinder, or nozzle needle lift. The following excellent results are available with the invention:

(1) Due to the arrangement of electronically controlling the above control valves in accordance with predetermined control programs in response to various factors representing the operating state of the engine, accurate control of the injection rate, injection quantity, injection timing and injection period is feasible.

(2) The arrangement of controlling the valve opening pressure of the injection nozzle, possibly in addition to controlling the injection pressure thereof, makes it possible to control the injection rate. That is, the injection quantity can be controlled by varying the injection rate, which in turn makes it possible to control the injection period always at optimum values, resulting in improvements in the exhaust gas, combustion noise and output characteristics of the engine.

(3) If the injection quantity Q is controlled by varying the injection pressure P in accordance with the equation of $A = CAt\sqrt{P}$, it is necessary to vary the pressure P over a wide range, since Q is proportional to a square root of P. However, according to the invention, the effective opening area A of the injection nozzle, which is directly proportional to Q, is controlled, thus making it possible to achieve efficient and accurate control of the injection quantity.

(4) The leading edge and trailing edge of the injection quantity curve can be varied by controlling the valve opening pressure of the injection nozzle, as shown in FIG. 13, which leads to fuel injection with good cut-off.

(5) The arrangement of electronically controlling the control valves for the injection pressure, injection timing, and valve opening pressure (effective opening area) of a fuel injection valve, does not require any independent injection apparatus such as a fuel injection pump conventionally used. Accordingly, the system according to the invention can dispense with a governor and an injection timing control device which are used with a conventional fuel injection pump, and can be therefore simple in construction and stable in operation.

Obviously many modifications and variations of the present invention are possible in the light of the above teachings. It is therefore to be understood that within the scope of the appended claims the invention may be practiced otherwise than as specifically described.

What is claimed is:

1. An electronic fuel injection control system adapted for combination with at least one fuel injection valve having an injection nozzle, said injection nozzle having a nozzle needle arranged to be lifted by fuel pressure, said fuel injection control system comprising:
   pressurized fuel supply means;
   passage means for leading pressurized fuel from said fuel supply means to said injection nozzle;
   injection timing regulating means for selectively opening and closing said passage means;
   valve opening pressure regulating means for regulating the valve opening pressure of said injection nozzle;
   detecting means for detecting a condition of an engine associated with said fuel injection valve to produce electrical signals indicative of the condition of said engine; and
   electronic control means responsive to said electrical signals to control said injection timing regulating means and said valve opening pressure varying means, said electronic control means including means for arithmetically calculating first and second control signals in a predetermined manner in response to said electrical signals and for supplying said first control signal to said injection timing regulating means to cause said injection timing regulating means to obtain a desired injection timing for the condition of said engine, and for supplying said second control signal to said valve opening pressure regulating means to cause said valve opening pressure regulating means to obtain a desired injection rate for the condition of said engine;
   said valve opening pressure regulating means comprising a solenoid arranged to be energized in response to said first control signal, and a movable member secured to said nozzle needle, said movable member being arranged to be displaced axially of said nozzle needle by electromagnetic force produced by energization of said solenoid.

2. The electronic fuel injection control system as claimed in claim 1, wherein said valve opening pressure regulating means comprises means for imparting back pressure to said nozzle needle in a manner such that said back pressure acts against the lifting action of said nozzle needle, and a pressure control valve responsive to said first control signal to vary said back pressure.

3. The electronic fuel injection control system as claimed in claim 2, wherein said back pressure imparting means includes said pressurized fuel supply means.

4. The electronic fuel injection control system as claimed in claim 2 or claim 3, wherein said pressure control valve comprises a solenoid valve.

5. An electronic fuel injection control system adapted for combination with at least one fuel injection valve having an injection nozzle, said injection nozzle having a nozzle needle arranged to be lifted by fuel pressure, said fuel injection control system comprising:
   pressurized fuel supply means; passage means for leading pressurized fuel from said fuel supply means to said injection nozzle;
   injection timing regulating means for selectively opening and closing said passage means;
   an engine load sensor for detecting a load on said engine;
   an engine speed sensor for detecting the speed of said engine;
   a valve opening pressure sensor for detecting the valve opening pressure of said injection nozzle;
   valve opening pressure regulating means for regulating the valve opening pressure of said injection nozzle;
   detecting means for detecting a condition of an engine associated with said fuel injection valve to produce electrical signals indicative of the condition of said engine;
   electronic control means responsive to said electrical signals to control said injection timing regulating means and said valve opening pressure varying means, said electronic control means including means for arithmetically calculating first and second control signals in a predetermined manner in response to said electrical signals and for supplying said first control signal to said injection timing regulating means to cause said injection timing regulating means to obtain a desired injection timing for the condition of said engine, and for supplying said second control signal to said valve opening pressure regulating means to cause said valve opening pressure regulating means to obtain a desired injection rate for the condition of said engine;
   memory means for storing target values of valve opening pressure corresponding to various conditions of said engine, said memory means being arranged to be supplied with outputs from said engine load sensor and outputs from said engine speed sensor; and
   a valve opening pressure controller arranged to be supplied with an output from said valve opening pressure sensor and with a target valve output from said memory means to control said valve opening pressure regulating means;
   said memory means and said valve opening pressure controller forming part of said electronic control means;
   said memory means being responsive to outputs from said engine load sensor and to outputs from said engine speed sensor to selectively supply a desired target value of valve opening pressure to said valve opening pressure controller;
   said valve opening pressure controller including means responsive to an output from said valve opening pressure sensor to correct said desired target value supplied from said memory means and to produce a resulting corrected target value.

6. The electronic fuel injection control system as claimed in claim 5, which further comprises:
   a top dead center sensor for detecting the top dead center position of a piston of said engine associated with said fuel injection valve;

an injection timing sensor for detecting the injection timing of fuel into an engine cylinder associated with said piston;

a lift timing sensor for detecting the lift timing of said nozzle needle;

memory means for storing target values of injection timing corresponding to various conditions of said engine, said injection timing target value memory being arranged to be supplied with outputs from said engine speed sensor and outputs from said valve opening pressure sensor;

an injection timing controller arranged to be supplied with outputs from said injection timing sensor, outputs from said lift timing sensor and outputs from said top dead center sensor and including means to control said injection timing regulating means;

said injection timing target value memory means and said injection timing controller forming part of said electronic control means;

said injection timing target value memory means being responsive to outputs from said engine speed sensor and from said valve opening pressure sensor to selectively supply a desired target value of injection timing to said injection timing controller;

said injection timing controller being responsive to outputs from said injection timing sensor and from said lift timing sensor to correct said desired target value supplied from said injection timing target value memory means to produce a resulting corrected target value with a timing as a function of the timing of an output being produced from said top dead center sensor.

7. The electronic fuel injection control system as claimed in claim 5, wherein said valve opening pressure regulating means comprises means for imparting back pressure to said nozzle needle in a manner such that said back pressure acts against the lifting action of said nozzle needle, and a pressure control valve responsive to said first control signal to vary said back pressure.

8. The electronic fuel injection control system as claimed in claim 7, wherein said back pressure imparting means includes said pressurized fuel supply means.

9. The electronic fuel injection control system as claimed in claim 7 or claim 8, wherein said pressure control valve comprises a solenoid valve.

10. The electronic fuel injection control system as claimed in claim 5, wherein said valve opening pressure regulating means comprises a solenoid arranged to be energized in response to said first control signal, and a movable member secured to said nozzle needle, said movable member being arranged to be displaced axially of said nozzle needle by electromagnetic force produced by energization of said solenoid.

11. An electronic fuel injection control system adapted for combination with at least one fuel injection valve having an injection nozzle, said injection nozzle having a nozzle needle arranged to be lifted by fuel pressure, said fuel injection control system comprising:

pressurized fuel supply means;

passage means for leading pressurized fuel from said pressurized fuel supply means to said injection nozzle;

injection timing regulating means for selectively opening and closing said passage means;

valve opening pressure regulating means for regulating the valve opening pressure of said injection nozzle;

injection pressure regulating means for regulating fuel pressure supplied to said injection nozzle;

detecting means for detecting a condition of an engine associated with said fuel injection valve to produce electrical signals indicative of said engine condition; and electronic control means responsive to said electrical signals to control said injection timing regulating means, said valve opening pressure regulating means and said injection pressure regulating means, said electronic control means including means for arithmetically calculating first, second or third control signals in a predetermined manner in response to said electrical signals and for supplying said first control signal to said injection timing regulating means to cause said injection timing regulating means to obtain a desired injection timing for said engine condition, and for supplying said second and third control signals to said valve opening pressure regulating means and to said injection pressure regulating means to cause same to obtain a desired injection rate for the condition of said engine.

12. The electronic fuel injection control system as claimed in claim 11, which further comprises:

an engine load sensor for detecting a load on said engine;

an engine speed sensor for detecting the speed of said engine;

an injection pressure sensor for detecting fuel pressure supplied to said injection nozzle;

memory means for storing target values of valve opening pressure and injection pressure corresponding to various conditions of said engine, said memory means being arranged to be supplied with outputs from said engine load sensor and from said engine speed sensor;

a valve opening pressure controller arranged to be supplied with an output from said valve opening pressure sensor and with a target value output corresponding to a valve opening pressure from said memory means to control said valve opening pressure regulating means; and an injection pressure controller arranged to be supplied with an output from said injection pressure sensor and with a target value output corresponding to an injection pressure from said memory means to control said injection pressure regulating means;

said memory means, said valve opening pressure controller and said injection pressure controller forming part of said electronic control means;

said memory means being responsive to outputs from said engine load sensor and from said engine speed sensor to selectively supply desired target values of valve opening pressure and injection pressure, respectively, to said valve opening pressure controller and to said injection pressure controller;

said valve opening pressure controller and said injection pressure controller being responsive, respectively, to outputs from said valve opening pressure sensor and from said injection pressure sensor to correct respective ones of said desired target values supplied from said memory means and to produce respective resulting corrected target values.

13. The electronic fuel injection control system as claimed in claim 12, which further comprises:

a top dead center sensor for detecting the top dead center position of a piston of said engine associated with said fuel injection valve;

an injection timing sensor for detecting the injection timing of fuel into an engine cylinder associated with said piston;

a lift timing sensor for detecting the lift timing of said nozzle needle;

memory means for storing target values of injection timing corresponding to various conditions of said engine, said injection timing target value memory means being arranged to be supplied with outputs from engine speed sensor, outputs from said valve opening pressure sensor and outputs from said injection pressure sensor;

an injection timing controller arranged to be supplied with outputs from said injection timing sensor, outputs from said lift timing sensor and outputs from said top dead center sensor and including means to control said injection timing regulating means;

said injection timing target value memory means and said injection timing controller forming part of said electronic control means;

said injection timing target value memory means being responsive to outputs from said engine speed sensor, from said valve opening pressure and from said injection pressure sensor to selectively supply a desired target value of injection timing to said injection timing controller;

said injection timing controller being responsive to outputs from said injection timing sensor and from said lift timing sensor to correct said desired target value supplied from said injection timing target value memory means and to produce a resulting corrected target value with a timing as a function of the timing of an output being produced from said top dead center sensor.

* * * * *